United States Patent [19]

Constable et al.

[11] 3,743,134

[45] July 3, 1973

[54] ACCESS-CONTROL EQUIPMENT AND ITEM-DISPENSING SYSTEMS INCLUDING SUCH EQUIPMENT

[75] Inventors: Geoffrey E. P. Constable; Dennis Arthur Lloyd, both of Cheltenham, England

[73] Assignee: Smiths Industries Limited, London, England

[22] Filed: Dec. 3, 1970

[21] Appl. No.: 94,698

[30] Foreign Application Priority Data

Dec. 3, 1969 Great Britain .................. 59,090/69

[52] U.S. Cl. .......... 221/2, 194/DIG. 9, 235/61.11 D, 340/149 A

[51] Int. Cl. .......... G06k 5/00

[58] Field of Search .......... 194/4, DIG. 9; 221/2; 235/61.7 B, 61.11 D; 340/149 A

[56] References Cited

UNITED STATES PATENTS

| | | | |
|---|---|---|---|
| 3,513,298 | 5/1970 | Riddle | 235/61.11 D |
| 3,401,830 | 9/1968 | Mathews | 221/2 |
| 2,653,189 | 9/1963 | Camras | 179/100.2 |
| 3,290,487 | 12/1966 | Scott | 235/61.11 D |
| 3,570,643 | 3/1971 | Maierhofer | 194/4 |
| 3,657,521 | 4/1972 | Constable | 235/61.7 B |
| 3,378,674 | 4/1968 | Unk | 235/61.11 D |

*Primary Examiner*—Robert B. Reeves
*Assistant Examiner*—Thomas E. Kocovsky
*Attorney*—William D. Hall, Elliott I. Pollock, Fred C. Philpitt, George Vande Sande, Charles F. Steininger and Robert R. Priddy

[57] ABSTRACT

A money-dispensing system is operative to dispense money in response to a bank customer's credit card and keyed-entry of his personal-identification number, only if this number accords with the customers's account number on the card and substantial equality of above-threshold magnitude is detected to exist between magnetic recordings read from two parallel tracks on the card. The recordings are read by two magnetic heads that have their sensing gaps (each possibly of stepped form) obliquely set in V-shaped configuration to the tracks, and are phase modulated in accordance with the rate of permissible use of the card. Dispensing is enabled only if this would be within the permissible rate, and the rate-of-use data on the card is up-dated by recording from the two heads. Data relating to the extent of permissible use of the card may also be read from the two tracks by a pair of read-only heads with obliquely set gaps, and then up-dated by erasure using a conventional straight gap.

27 Claims, 7 Drawing Figures

Geoffrey Ernest Patrick Constable
Dennis Arthur Lloyd
Inventors
by Elliott I. Pollock Geoffrey Ernest Patrick Constable
Dennis Arthur Lloyd
Inventors
by Elliott I. Pollock
Attorney Geoffrey Ernest Patrick Constable
Dennis Arthur Lloyd
Inventors by Elliott I. Pollock
Attorney

ACCESS-CONTROL EQUIPMENT AND ITEM-DISPENSING SYSTEMS INCLUDING SUCH EQUIPMENT

This invention relates to access-control equipment and item-dispensing systems including such equipment.

The invention is especially concerned with access-control equipment of the kind for use in controlling access to a facility in dependence upon a token presented to the equipment. The token, for example, may be in the form of a card that carries information relevant to the gaining of access, and in these circumstances each person authorized to make use of the facility may be issued with a card of this form embossed or otherwise encoded with information individual to that person, for presentation to the equipment when access is required.

According to the present invention there is provided access-control equipment, including token-receiving means for receiving a token presented to the equipment, a plurality of magnetic reading heads for reading magnetic recordings from the received token, and release means that is operable as a prerequisite to the enabling of access, and wherein it is arranged that operation of said release means is inhibited in the event that a predetermined relationship is not detected between the recordings read from the token by the individual heads.

The reading heads may be arranged side-by-side to read recordings from parallel magnetic-recording tracks of the token. Each head may be arranged such that its reading gap extends obliquely across the respective track and with the reading gaps of the different heads out of alignment with one another. In particular where two heads are involved these may be arranged such that their gaps extend across te respective tracks at angles of equal magnitude but opposite sense with respect to the track-length. Each gap may be of straight form across the width of the respective track, or may be of a stepped form providing a plurality of obliquely oriented straight sections displaced from one another lengthwise of the respective track.

It may be arranged that operation of the release means is inhibited in the event that substantial equality is not detected between the magnitudes of the output signals of the reading heads, or in the event that these magnitudes are not detected as each exceeding a predetermined threshold level. Operation of the release may also, or alternatively, be inhibited in the event that the existence of a predetermined phase relationshiop (in-phase, or anti-phase, for example) between the output signals of the heads is not detected. Detection of the existnce of any or all of these relationships may be used as a simple check on authenticity of the request for access. This check may however be coupled with a check that involves data recorded magnetically on the token and read therefrom by the reading heads. Operation of the release means may in these latter circumstances be arranged to be dependent upon this data read from the token. The data, which may be read out in accordance with the relative phase relationships that exist between corresponding recordings read by the different heads, may relate for example to the extent and, or alternatively, rate of permitted use, of the token. In this latter respect it may be arranged that the data recorded on the token is up-dated on each operation of the release means by that token, the up-dating being effected, for example, using the same magnetic heads as used for reading.

The access-control equipment according to the present invention, may be arranged to enable selectively, access to any forn of facility, for example, entry to a restricted area, use of a service, or release of means enabling withdrawal of an item or product (in predetermined or selected quantity). In the latter context the equipment may form part of an item-dispensing system, the equipment in this regulating operation of a dispenser. One particular application of such a system is in the field of banking where a money-dispensing system is to be provided for use by customers at all times, the customers being issued with individual tokens for presentation to the system when withdrawal of money is required. The equipment of the present invention is this latter connection may be arranged to regulate operation of the money-dispenser so that money (for example, in bank-note form) is dispensed to the customer in response to each valid 'request' for withdrawal, a valid 'request' in this context involving, at least, presentation of the equipment of a token bearing magnetic recordings that have the predetermined 'authentic' relationship to one another.

A money-dispensing system in accordance with the present invention, will now be described, by way of example, with reference to the accompanying drawings, in which.

Figure 1:
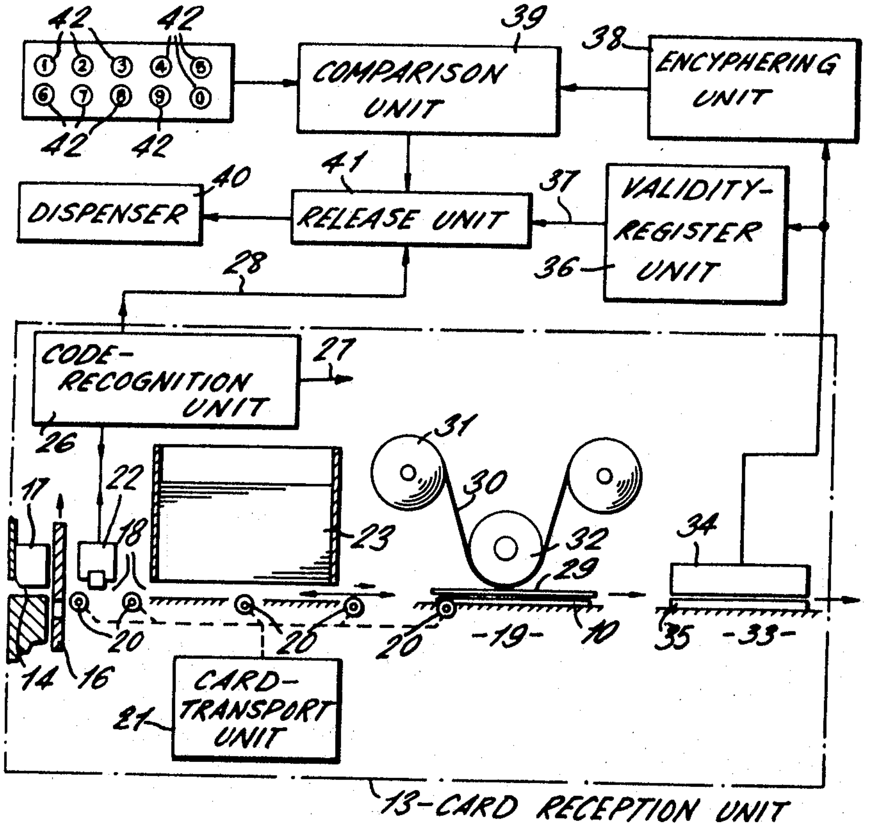
FIG. 1 is a schematic representation of the money-dispensing system.
Figure 2:
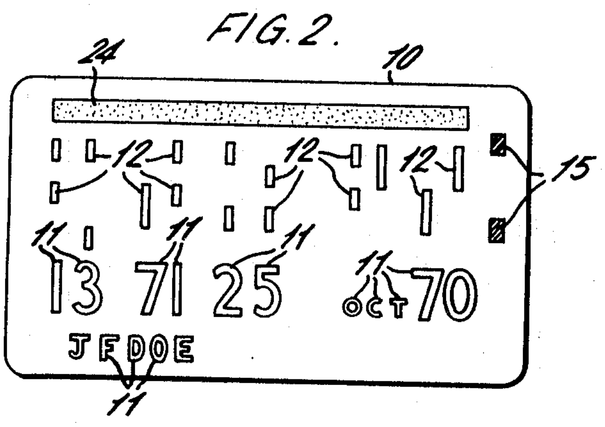
FIG. 2 is a representation of an embossed card used with the system of FIG. 1.

Te money-dispensing system represented in FIG. 1 is operable to dispense packets of bank-notes, one at a time to authorized customers of a bank after, as well as during, normal banking hours. The customers authorized to use the system are each issued with a coded token in the form of a rectangular plastics card 10 that may be used generally as a credit card. Each card 10, as shown in FIG. 2, bears the date of expiry and numerical information identifying the account of the customer to whom the card has been issued, and this information, as well as being embossed directly on the card in alpha-numeric characters 11, is embossed thereon according to a two-out-of-five decimal code using bar-characters 12.

Each customer is informed of a secret, person-identification number that is individual to his account but cannot be deduced from the card 10 itself, and of a maximum, permissible rate of use of the card to withdraw packets of bank-notes. For the purposes of the present description it will be assumed that the maximum rate of withdrawal is once in any day.

When the customer wishes to withdraw a packet of bank-notes he presents his card 10 to a card-reception unit 13 of the system. Te unit 13 has a facia that is mounted in an external wall of the bank to be accessible from outside and provide an entrance 14 for the card 10. The card 10, which as shown in FIG. 2 carries dark markings 15 at one end, is inserted in the entrance 14 lengthwise with the embossings 11 and 12 uppermost and wth the markings 15 just within the unit 13. Entry of the card 10 further is blocked by an apertured shutter 16 until the existence, with appropriate location on the card 10, of the markings !15 is detected by a photoelectric detecting arrangement 17. Detection of the appropriately located markings 15 causes the shutter 16 to be lifted to admit the card 10 fully to the unit 13 through the entrance 14.

Figure 3:
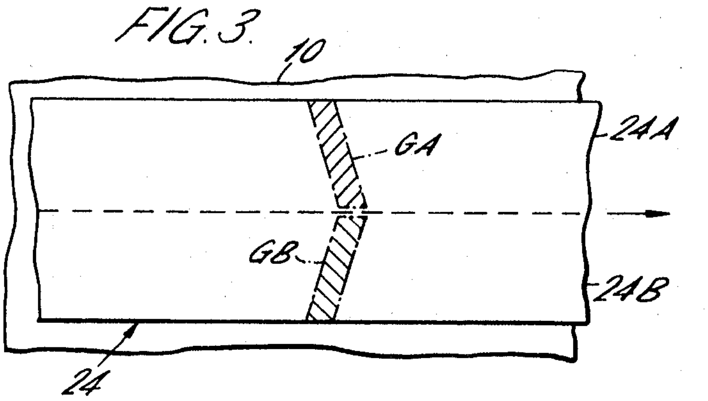
FIG. 3 is an enlarged view of a part of the card of FIG. 2, illustrating the magnetic recording tracks embodied in the card and the relative orientation of magnetic recording heads used to record information in these tracks.

The card 10 admitted fully to the unit 13 is drawn lengthwise along a guideway 18 to an imprinter 19 by rollers 20 that are driven by a card-transport unit 21. In its passage along the guideway 18 athe card 10 passes successively beneath a reading-recording head-unit 22 and a stack 23 of punched-card blanks. The head unit 22 reads from the card 10 withdrawal-rate information that is recorded magnetically in a strip 24 of ferromagnetic oxide inset, as indicated in FIG. 2, lengthwise of the cards 10. The information in this case is provided by the date on which the card 10 was last used, and this date is recorded in binary-coded form as modulation of the frequency of an alternating-current signal recorded in two parallel tracks 24A and 24B throughout the length of the strip 24. The division of the strip 24 along its center-line into the two tracks 24A and 24B of equal width is indicated in FIG. 3.

The recording in the strip 24 is made using two magnetic heads that are positioned very closely side-by-side in register with the two tracks 24A and 24B respectively. The recording heads a straight recording gaps oriented to extend obliquely across the respective tracks 24A and 24B, the two gaps, as indicated by the shaded areas GA and GB in FIG. 3, making angles of equal magnitude but opposite sense to the track-length. Te binary-encoded data is recorded in the two tracks 24A and 24B simultaneously, using a carrier oscillation having a frequency of, for example, 4 kilocycles per second. The carrier is applied to the two recordijg heads with a relative phasing that is switched from in-phase to anti-phase in accordance with the binary data to be recorded, the digit 0 being recorded by application of the carrier to the two heads in phase, and the digit 1 by application of the carrier to them in anti-phase.

Figure 4:
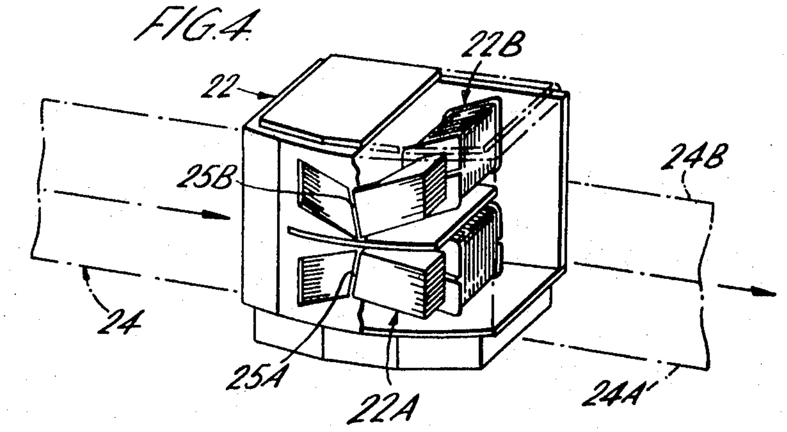
FIG. 4 is a perspective view from below, and partly broken away, of a unit that embodies two magnetic heads and is used in the system of FIG. 1 for reading and recording information on the embossed card of FIG. 2.

The phase-modulated and angled recordings made in the tracks 24A and 24B by the recording heads, can be read out intelligibly only if a pair of reading heads with corresponding oriented and closely positioned reading gaps are used; the unit 22, as shown in FIG. 4, comprises two such heads 22A and 22B having mutually inclined gaps 25A and 25B respectively. These heads 22A and 22B are located over the path of the strip 24 along the guideway 18, and read out the withdrawal-rate information from the strip 24 as the card 10 passes beneath them.

Signals in accordance with the recorded withdrawal-rate information read from the card 10 by the heads 22A and 22B are supplied to a code-recognition unit 26. The signals are there used as the basis for two security checks. The first of these is a check on the authenticity of the request for money, to the extent that the unit 26 checks that the signals supplied by the heads 22A and 22B are in-phase or anti-phase with one another and have nominally equal magnitudes that exceed a predetermined threshold level. This check is satisfied, and a signal is as a result supplied on a lead 27, only if the recording in the strip 24 has been made using a pair of simultaneously energized and closely positioned recording heads appropriately oriented with respect to the strip 24 as described above with reference to FIG. 3. In general it is not possible to satisfy the phasing aspect of this check or the requirement for output-signal equality, unless a pair of heads is used (recording in the tracks 24A and 24B successively, using a single head will not satisfactorily achieve the phase synchronism required). Furthermore, it is not possible in general to satisfy the requirement that the two output-signals exceed the threshold level unless the two heads have the authentic orientation with respect to the strip 24 and each other (other orientations will give rise to destructive interference across the track-width).

The second check carried out in the unit 26 determines from the date encoded by the magnetic recordings in the strip 24, whether the dispensing of money to the customer would cause him to exceed the maximum permissible withdrawal rate. To this end the output signals of the unit 22 are compared in phase in the unit 26 to decode the date and determine whether this is prior to the current date. If it is, and the once-in-a-day rate would accordingly not be exceeded, an output signal indicative of this fact is supplied from the unit 26 to a lead 28. The supply of this signal to the lead 28, which as described later is a prerequisite for the dispensing of money to the customer, is inhibited in the event that no signal is supplied to the lead 27. Thus the signal appears on the lead 28 after passage of the received card 10 beneath the head unit 22, only in the event that both checks carried out in the unit 26 are satisfied.

From the head unit 22 the card 10 passes beneath the stack 23 of punched-card blanks, and as shown in FIG. 1, carries with it into the imprinter 19 the lowermost blank 29. A carbon ribbon 30 fed from a supply spool 31 within the imprinter 19, is pressed downwardly by a roller 32 on to the blank 29 as this is driven with the card 10 into the imprinter 19. The card 29 is accordingly imprinted in carbon-ink with the embossed characters 11 and 12 of the card 10. The ribbon 30 is of the 'total transfer' kind, the carbon ink transferred on to the blank 29 at the embossings 11 and 12 leaving transparent windows that provide another, supplementary record of the card 10. The imprinted blank 29, providing the principal record, is now separated from the card 10 and passes through a photoelectric card-reader 33, leaving the card 10 behind in the imprinter 19.

The imprinted blank 29 passes between a reading head 34 and a platen 35 in the card reader 33. The head 34 includes five photocells (not shown) for sensing the imprints of the bar-characters 12 and providing therefrom a column-by-column readout of the imprinted decimal-encoding. Signals in accordance with the account number and expiry data read out in this way are supplied to a validity-register unit 36. The expiry data and account number are here checked to ascertain whether the card 10 is still in force and not otherwise invalid; in the latter respect to the unit 36 checks the account number against the account numbers of customer's cards that are no longer valid by virtue of having been reported as lost or stolen. If the result is satisfactory on both counts, then a signal indicative of this is supplied from the unit 36 to a lead 37.

The signals representative of the account number read out from the imprinted blank 29 are also supplied from the unit 33 to an encyphering unit 38 which acts according to an involved and secret program to derive from his number the corresponding personal-identification number. Signals in accordance with this derived number are conveyed to a comparison unit 39 that controls release of a bank-note dispenser 40 via a release unit 41.

The customer is now instructed by illumination of a sign (not shown) on the facia of the unit 13 to enter his personal-identification number into the system. The number, preferably of six digits, is entered using a set of 10 push-buttons 42 mounted on the facia of the unit 13 and numbered 0 to 9. As the push-buttons 42 are operated one at a time to enter the digits sequentially, their values are conveyed to the comparison unit 39. In the unit 39 the manually entered number is compared digit-by-digit with the number derived from the account number in the encyphering unit 38. If there is correspondence between them and the appropriate signals are present on the leads 28 and 37 to signify that the checks as to authenticity, withdrawal-rate and validity carried out in the units 26 and 36 are all satisfied, then the unit 41 releases the dispenser 40 to dispense a single packet of bank-notes to the customer through a delivery-slot (not shown) in the facia of the unit 13. Once dispensing has taken place the card transport unit 21 drives the rollers 20 to transport the card 10 back from the imprinter 19 to be returned to the customer through the entrance 14. The heads 22A and 22B of the unit 22 are appropriately energized from the unit 26 during this to record the current date (in the characteristic frequency-modulated form) in the strip 24 of the card 10, and thereby up-date the withdrawal-rate information on the card.

The unit 41 does not release the dispenser 40, and no dispensing therefore takes place, in the event that the numbers compared by the unit 39 do not correspond, or any of the three checks on authenticity, withdrawal-rate and validity carried out by the units 26 and 36, are not satisfied. In the circumstances in which there is no correspondence between the compared numbers, or the check on withdrawal rate is not satisfied, the card 10 is returned but without any up-dating of the withdrawal-rate information in this case. The card 10 is however driven from the imprinter 19 to be retained in a safe bin (not shown) within the system, in the event that either of the authenticity- and validity- checks is not satisfied; the criterion for retention and the operation of the unit 21 to this end, is absence of a signal from either of the two leads 27 and 37. In all cases where there is no dispensing, the imprinted punched-card blank 29 is stamped (by means not shown) to indicate this.

The blank 29 imprinted with the information from the card 10 and retained within the system, provides a record of the transaction, whether successful or not, for the necessary accounting and checking purposes. The main basis for the dispensing operation is the information, in particular the account number, encoded on the card 10, and the fact that this is read from the imprinted blank 29 rather than from the card 10 itself, is of substantial advantage. In particular it ensures that the dispensing operation is conditional upon there being an accurate and legible record of the transaction. The use of the imprinted record 'in the loop,' as an essential part of the dispensing operation in this way, is the subject of constable U.S. application No. 851,186 filed Aug. 19, 1969, now U.S. Pat. No. 3,641,497.

The security of the system as regards the dispensing of packets of money is very dependent on the security of the magnetic-checking operation. The dimensioning and close positioning of the authentic heads 22A and 22B, in addition to the accurate angled-orientation of their gaps 25A and 25B, are significant factors in this. The heads 22A and 22B in this respect may each have a width of 0.050 inch and the spacing between them may be not more than 0.001 inch at the record surface. Furthermore, the heads 22A and 22B may be set with their gaps 25A and 25B offset from the normal to the track-length by as little as 1° (i.e. with an included angle between the gaps of as much as 178°). The wavelength of the record in the track may be 0.001 inch, and at the carrier frequency of 4 kilocycles per second the speed of passage of the card 10 beneath the heads may then be 4 inches per second. Accurate location of the card 10, and therefore of the strip 24, laterally beneath the heads in the guideway 18, is of course essential to correct operation.

Figure 5:
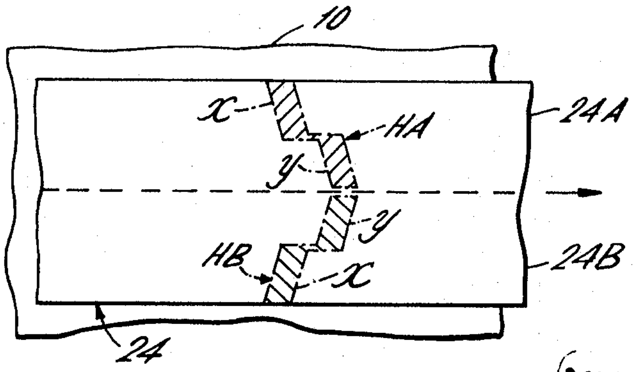
FIG. 5 is an enlarged plan veiw corresponding to FIG. 3, to which reference is made in relation to a modification of the recording of information in the magnetic recording tracks of the card of FIG. 2.

Provided access to the head unit 22, and to similar head units elsewhere, is rigidly controlled, there is little likelihood of anyone with fraudulent intent being able to forge a card, or even extend the use of an authentic one, to satisfy the magnetic checking operation that is carried out by the units 22 and 26. The constructional problem associated with heads of the form described above provides significant discouragement in itself. If necessary, however, the degree of discouragement may be increased by using a form of head having a gap of stepped configuration. The configuration involved in this case may be as indicated by each of the shaded areas HA and HB in FIG. 5, the gaps of the two heads involved in this example each having two obliquely oriented and interconnected straight sections *x* and *y* displaced from one another lengthwise of the relevant track 24A or 24B.

The once-in-any-date withdrawl-rate used in the system described above is simple in that it enables the necessary record of prior use to be recorded on, and read from, the customer's card as a single date. Clearly where a withdrawal-rate allowing a plurality of withdrawals in any period, is prescribed, more data will normally be involved. For example, a withdrawal-rate of three times in any one day, or 10 times in any period of 7 days, might be prescribed, but in any case, the operation of the system described above in monitoring and up-dating the withdrawal-rate data recorded on the customer's card remains essentially the same; the only significant difference lies in the necessity to deal with, and process, more data.

It may be desirable to limit the extent to which the customer's card may be used, for example to limit its use to 50 withdrawals. This limitation, which may be provided in addition, or as an alternative, to the rate-of-use limitation, may be effected by recording an appropriate number of pulses on the card and erasing one of these on each successful transaction, the equipment acting to detect the existence of one or more pulses remaining on the card before each transaction and to inhibit operation of the dispenser 40, and retain the card, in the event that there are none. The pulses may be recorded magnetically using a pair of magnetic heads with mutually inclined recording gaps, and the unit 22 in the card-reception unit 13 may then include a corresponding pair of heads simply for detecting these recorded pulses; the erasure can be effected using a normal straight-gap head that is energized to erase from the card 10 the first pulse detected. The pair of heads used in this way in the unit 22 are required only to read and not to record, and in this case may be constructed to have an inherently poor recording characteristic so that even if they are stolen they are of little value for fraudulent purposes.

Figure 6:
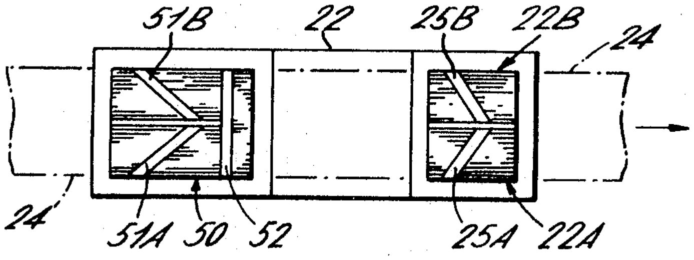
FIG. 6 is a view from below of the reading-recording head-unit of FIG. 4 as modified to include three additional magnetic heads.

An arrangement of magnetic head in the unit 22 to provide for checks on both the rate and extent of use of the card 10, is illustrated by FIG. 6. In the case illustrated the withdrawal-rate information is recorded in the strip 24 at a position spaced along the card 10 from the recording in the same strip 24 of the extent-of-use pulses. The recordings are made by individual head-pairs of different V-shaped gap-configurations.

Referring to FIG. 6, the heads 22A and 22B used for reading the withdrawal-rate information from the strip 24 are as shown in FIG. 4, and are in this case mounted in-line with a multiple-head device 50 used for detecting and erasing the extent-of-use pulses. The device 50, comprises in effect three magnetic heads of which two provide gaps 51A and 51B respectively, that are inclined to one another in a V-shaped configuration corresponding to that of the gaps 25A and 25B, so as to register obliquely with separate halves of the track 24. The third head has a straight gap 52 that extends directly across the full width of the track 24, and is energized transitorily in response to detection of the first extent-of-use pulse at the gaps 51A and 51B, in order that this one pulse shall be erased.

The angle of the V-shaped gap-configuration (gaps 51A and 51B) provided by the device 50 is different from that of the V-shaped gap-configuration (gaps 25A and 25B) provided by the heads 22A and 22B. This corresponds to the difference between the gap-configurations of the pairs of heads used for the initial recording of the withdrawal-rate and extent-of-use information on the card 10. This difference in gap-configuration enables the two recordings to be distinguished from one another on the basis of difference in signal level at the reading heads. Also for the purpose of clear differentiation between the recordings, the location of the pair of heads 22A and 22B both in relation to the device 50 and along the guideway 18, is chosen such that the recording of the withdrawal-rate information arrives at the gaps 25A and 25B for read out concurrently with the arrival at the gaps 51A and 51B of the recorded extent-of-use pulses, and at a precisely timed instant after passage of the card 10 fully into the card-reception unit 13.

Figure 7:
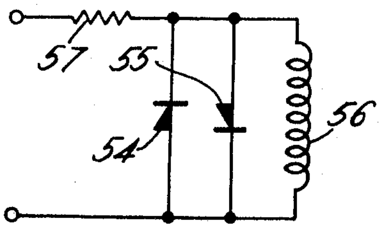
FIG. 7 illustrates an electrical circuit used for security purposes in two of the additional magnetic heads of the modified unit shown in FIG. 6.

The gaps 51A and 51B are used for reading only, and the device 50 is in this respect deliberately constructed to be incapable of providing a sensible recording of the characteristic V-shaped extent-of-use pattern. This is achieved by limiting the voltage and current that can be applied externally to the electrical pick-up windings associated individually with the gaps 51A and 51B in the devide 50. Voltage limitation is achieved in each case, as illustrated in FIG. 7, by the connection of two semiconductor diodes 54 and 55 in opposite senses to one another across the individual pick-up winding 56; the voltage signals induced in the winding 56 during reading are themselves insufficient to cause either diode 54 and 55 to conduct. Current limitation is achieved by means of a small fuse 57 included in series with the winding 56, and this fuse 57 and the two diodes 54 and 55 are embedded within the winding 56 in the device 50 in such a way that access to any of one of them can be gained only by destruction of the winding 56. This accordingly reduces the possibility of the device 50 being used fraudulently to record extent-of-use pulses.

Reference is directed to Constable U.S. Patent application No. 66,181, filed Aug. 24, 1970, which is concerned inter alia with the use in access-control equipment and dispensing systems of two magnetic heads that serve together to define a two-part gap of V-shape configuration, but in that specific arrangement the two heads act as one, their output signals being combined so that there is no detection of the relationship between them.

Details of an encyphering unit suitable for use as the encyphering unit 38 are described in Constable U.S. Pat. application No. 66,182, filed August 24, 1970, now U.S. Pat. No. 3,657,521. Furthermore, there is described in the above-mentioned Constable U.S. Pat. No. 3,641,497 and also in Constable et al. U.S. Pat. No. 3,611,293, and in Randall et al. U.S. Pat. No. 3,629,834, a form of money-dispensing system that involves on-line communication between each of a number of money-dispensing terminals and a central station that serves to check and up-date the account status of each customer making a request for withdrawal of money; although the system described in the present specification is not of this form, the invention is nonetheless just as applicable to on-line systems.

We claim:

1. Access-control equipment comprising means for receiving a token presented to the equipment, security means for inhibiting unauthorized access to the equipment comprising a plurality of magnetic reading heads for reading magentic recordings from the received token, said reading heads having reading gaps which are out of alignment with one another, means mounting said reading heads closely side-by-side with their reading gaps out of alignment respectively to read recordings from parallel magnetic-recroding tracks of the token, at least one of the reading heads being mounted with its reading gap extending obliquely to said tracks, detector means to detect whether a predetermined relationship exists between the recordings read from the token by the individual heads, and release means that is operable as a prerequisite to the enabling of access, said release means being coupled to said detector means to be operable only in the event that said predetermined relationship is detected between the recordings.

2. Access-control equipment according to claim 1 wherein at least one of the reading heads has a reading gap of a stepped form to provide a plurality of obliquiely oriented straight sections displaced from one another lengthwise of said tracks.

3. Access-control equipment according to claim 1 wherein at least one of said reading heads includes means to inhibit energization of the head to record magnetically on the token.

4. Access-control equipment according to claim 1 wherein the reading means includes means to detect the existence of substantial equality between the magnitudes of the output signals of the reading heads and also includes means to detect the existence of a predetermined phase relationship between the said output signals, said release means being operable only in the event that both said substantial equality in magnitude and said predetermined phase relationship are detected between said output signals.

5. Access-control equipment according to claim 1 including means for transporting the received token along a path past the reading gaps of the magnetic heads, and means mounting theheads to present their gaps oblique to said path.

6. Access-control equipment according to claim 5 wherein there are two reading heads mounted with their gaps oblique to said path at angles of equal magnitude but opposite sense to one another.

7. An item-dispensing system comprising means providing an entrance for admitting an information-bearing token to the system, token-reading means spaced from said entrance, token-transporting means for transporting the admitted token along a path to the token-reading means, said token-reading means being operative to read information from the token transported thereto, security means for inhibiting unauthorized dispensing of items comprising magnetic reading-means mounted at a point along said path to read magnetic recordings from the token transported past said point to the token-reading means, said magnetic reading-means including a plurality of reading-head means having individual magnetic sensing-gaps for sensing respective ones of said recordings, said gaps being inclined obliquely to one another and to said path, detector means for detecting whether a predetermined relationship exists between the magnetic recordings read from the token by the individual head-means, item-dispensing means operable to dispense from a reserve of items at least one such item upon each operation of the item-dispensing means, and means for enabling operation of the item-dispensing means in dependence upon the information read from the token by the token-reading means and then only if said predetermined relationshiop is detected by said detector means.

8. An item-dispensing system according to claim 7 wherein sid reading-means includes two straight-gap magnetic heads, and means mounting the two heads with their gaps oblique to one another in a V-shaped configuration.

9. An item-dispensing system aCcording to claim 7 wherein said item-dispensing means is means for dispensing money at a bank.

10. An item-dispensing system according to claim 7 wherein the token-transporting means is also operable to return the token along said path from the token-reading means to said entrance only in the event that said predetermined relationship is detected by said detector means.

11. An item-displacing system according to claim 10 wherein said detector means includes means for energizing at least some of said head-means to record magnetically on the token during return of the token to said entrance.

12. An item-dispensing system according to claim 10 wherein said detector means includes means to detect the condition in which the magnitudes of output signals of the reading head-means each exceed a predetermined threshold level, and wherein operation both of said item-dispensing means and of said token-transporting means to return the token as aforesaid, is dependent on the detection of said condition by said detector means.

13. Access-control equipment comprising: means for receiving a token presented to the equipment; security means for inhibiting unauthorized access to the equipment comprising magnetic reading-head means for reading magnetic recordings of information recorded out of alignment respectively in a plurality of magnetic tracks of the received token, said reading head means comprising gap-defining means defining a plurality of magnetic-reading gaps for sensing the non-aligned magnetic recordings in respective ones of said tracks, said gaps being inclined to one another, and means mounting said gap-defining means to present at least one of said gaps obliquely to its respective track; detector means to detect whether a predetermined relationship exists between the recordings read from the said tracks of the token by the magnetic reading-head means; and release means that is operable as a prerequisite to the enabling of access, said release means being coupled to said detector means to be operable only in the event that said predetermined relationship is detected between the recordings.

14. Access-control equipment according to claim 13 wherein said reading-head means comprises two magnetic reading heads mounted side-by-side with their reading gaps oblique to one another in a V-shaped configuration.

15. Access-control equipment according to claim 13 wherein said detector means includes means to detect whether there is substantial equality in magnitude between the recordings sensed by the different ones of said gaps, and said release means is operable only in the event that said substantial equality is detected.

16. Access control equipment according to claim 13 wherein said detector means includes means to detect the condition in which the recording sensed by each gap exceeds a predetermined threshold level, and said release means is operable only in the event that said condition is detected.

17. Access-control equipment according to claim 13 wherein said detector means includes means to detect the existence of a predetermined phase relationship between the recordings sensed by the gaps, and said release means is operable on ly in the event that said predetermined phase relationship if detected.

18. Access-control equipment according to claim 13 wherein the token-receiving means includes means providing an entrance for admitting the presented token to the equipment, and means operable to return the token through said entrance only in the event that the detector means detects the existence of said predetermined relationship.

19. Access-control equipment according to claim 13 in combination with dispensing means that is responsive to operation of said release means to perform a dispensing function.

20. Access-control equipment according to claim 13 including means for reading information borne by the received token, means for entering a plural-character word into the equipment, and comparator means for detecting whether a predetermined correspondence exists between the said information read from the token and the plural-character word, and wherein said release means is means operable to enable access only in the event that both said predetermined correspondence and said predetermined relationship are detected by said comparator and detector means respectively.

21. Access-control equipment according to claim 20 wherein said means for reading information from the received token, comprises means for making a record of information borne by the token, and means for reading from said record part at least the information recorded thereon.

22. Access-control equipment according to claim 13 wherein said reading head means is operative to read out data recorded magnetically on the token, and said detector means is operative to enable operation of aid release means in dependence upon the data content of said read-out.

23. Access-control equipment according to claim 22 wherein said data is read out in accordance with the relative phase relationship that exists between corresponding recordings sensed by different ones of said gaps.

24. Access-control equipment according to claim 22 wherein at least part of the data read out relates to rate of use of the token, and said detector means is operative to inhibit operation of said release means in the event that a predetermined permitted rate of use would otherwise be exceeded.

25. Access-control equipment according to claim 24 wherein said detector means includes means to energize at least some of said gaps in accordance with updated rate-of-use data to record this data magnetically on the token.

26. Access-control equipment according to claim 22 wherein at least part of the data read out relates to the extent of permitted use of the token, and said detector means is operative to inhibit operation of said release means in the event that a predetermined extent-of-use would otherwise be exceeded.

27. Access-control equipment according to claim 26 including means operative to erase from the token at least part of the extent-of-use data.

* * * * *